United States Patent [19]

Datta et al.

[11] 4,410,748
[45] Oct. 18, 1983

[54] HIGH DENSITY INFORMATION DISC LUBRICANTS

[75] Inventors: Pabitra Datta, Cranbury; Eugene S. Poliniak, Willingboro, both of N.J.

[73] Assignee: RCA Corporation, New York, N.Y.

[21] Appl. No.: 344,534

[22] Filed: Feb. 1, 1982

[51] Int. Cl.³ .......................... B32B 3/02; C10M 3/44
[52] U.S. Cl. ........................................ 585/4; 369/288;
369/126; 346/137; 428/447; 428/900; 252/50;
252/51.5 R; 252/49.6
[58] Field of Search .................... 585/4; 369/288, 126;
252/50, 51.5, 49.6; 428/447, 900; 346/137

[56] References Cited

U.S. PATENT DOCUMENTS

| 3,833,408 | 9/1974 | Matthies | 117/217 |
| 3,842,194 | 10/1974 | Clemens | 178/6.6 A |
| 4,125,668 | 11/1978 | Pardee | 369/288 |
| 4,275,101 | 6/1981 | Wang et al. | 369/286 |
| 4,346,468 | 8/1982 | Preston et al. | 369/288 |

Primary Examiner—Jacqueline V. Howard
Attorney, Agent, or Firm—Birgit E. Morris

[57] ABSTRACT

High density information records comprising a conductive carbon-loaded polyvinylchloride record are lubricated with a long chain polyalkylethylene containing a polar dopant substituted with a long chain alkyl group in amounts sufficient to reduce sensitivity of the records to moisture.

9 Claims, No Drawings

HIGH DENSITY INFORMATION DISC LUBRICANTS

This invention relates to high density information records lubricated with a hydrocarbon lubricant composition. More particularly, this invention relates to high density information records lubricated with a hydrocarbon lubricant containing a polar dopant.

BACKGROUND OF THE INVENTION

Clemens, in U.S. Pat. No. 3,842,194, has disclosed a system for recording and playback of information, including audio, video, and color information, capacitively. A high density information record has signal information in the form of a surface relief pattern in an information track, e.g., a spiral groove on the surface of the record. The record is made conductive with a metal layer, which acts as the first electrode of a capacitor, and then with a dielectric layer. The record is played back by means of a stylus electrode which is the second electrode of the capacitor. Since the record is rotated at a fairly high speed, on the order of 450 rpm, the friction between the stylus and the record surface may result in undue stylus wear. Thus a lubricant is applied to the surface of the record.

A suitable class of lubricants has been described by Matthies in U.S. Pat. No. 3,833,408, herein incorporated by reference. These lubricants have the general formula

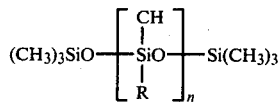

wherein R is an alkyl group of 4 to 20 carbon atoms and n is an integer.

Various improvements have been made to the record of Clemens including a record made from a conductive plastic which avoids the need for applying separate conductive metal and dielectric layers. Such a record may contain conductive particles for example. Improvement has also been made to the lubricant system. It has been found that when the lubricant is purified and fractionated, improved playback and storage stability results. The fractionated lubricant has the formula

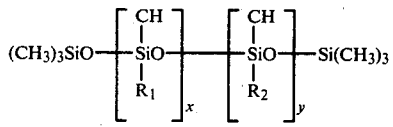

wherein $R_1$ and $R_2$ are alkyl groups of 4–20 carbon atoms, x is an integer of 2–4 and y is an integer of 0–2 and wherein the sum of x and y is 4 or less. These lubricants are described by Wang et al. in U.S. Pat. No. 4,275,101, also incorporated herein by reference.

Some problems still remain for the lubricated conductive record. The record surface has been found to be sensitive to moisture; that is, when the record is exposed to ambient conditions over a period of time, particularly including conditions of high relative humidity, a thin layer of organic and inorganic water soluble salt deposits form on the surface of the record, lifting the stylus during playback and interrupting the signal. This loss of signal has been termed "carrier distress". This carrier distress has been alleviated somewhat by careful cleaning and drying of the record surface which removes water soluble materials that have formed on the surface during molding operations. However, with time, additional water soluble materials and external debris form on the surface of the record, particularly in the presense of water vapor. Further, this requirement of cleaning and drying of the records adds to the cost of manufacture. It would be desirable to eliminate this extra processing of the disc.

Thus, more recently, the fractionated methyl alkyl siloxane lubricant has been doped with various materials including hydroxylated amines and polar silicones which have improved the resistance of the disc surface to carrier distress. We have insufficient knowledge at the present time about the nature of the disc surface to predict which materials will be effective in reducing susceptability of the disc to degeneration of playback after exposure to heat and high relative humidity.

Up until now, hydrocarbon lubricants have been ineffective to lubricate the disc surface, even though as a class hydrocarbon lubricants have improved resistance to oxidation, moisture, and shear stress. We believe that this is due to the fact that the disc surface is highly polar, whereas hydrocarbons are non-polar and thus the problem is they do not wet the surface of the disc well or adhere well to the disc surface, particularly after playback.

SUMMARY OF THE INVENTION

We have found that when certain hydrocarbons are doped with polar materials having long chain hydrocarbon groups, excellent lubrication of high density information records is obtained and the discs retain excellent stability to the effects of ambient atmospheric conditions.

DETAILED SUMMARY OF THE INVENTION

The hydrocarbons useful as lubricants according to the present invention are polyalkylethylenes having the formula

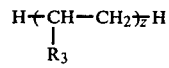

wherein $R_3$ is an alkyl group of 4–20 carbon atoms, preferably 10 carbon atoms or more, and z is an integer greater than 1.

The above described hydrocarbon lubricant is combined with a polar dopant having a long chain pendant alkyl group. Suitable dopants include, for example, hydroxylated amines of the formula

wherein $R_4$ is hydrogen, lower alkyl or hydroxylalkyl; $R_5$ is $R_7A$ wherein $R_7$ is an alkyl group of 1 to 5 carbon atoms and A is hydroxyl or carboxyl; $R_6$ can be $R_8A$ wherein $R_8$ is a straight chain alkyl group of 1 to 10 carbon atoms and A has the meaning given above, or $R_8$—A—B—$R_9$ wherein $R_8$ and A have the meanings given above, B is a linking group which can be —O— or —C≡C— and $R_9$ is an alkyl group of 6 to 25 carbon atoms; or their corresponding quaternary ammonium salts; bis(hydroxylalkyl)disiloxanes of the formula

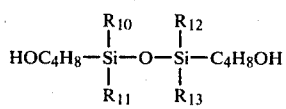  (2)

wherein $R_{10}$ and $R_{12}$ are methyl or ethyl and $R_{11}$ and $R_{13}$ are linear long chain alkyl groups of up to 20 carbon atoms, as disclosed by Wang et al. in copending application Ser. No. 231,859, filed Feb. 5, 1981, now U.S. Pat. No. 4,355,062; or betaines of the formula

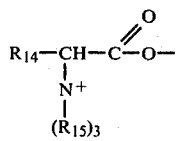

wherein $R_{14}$ is a long chain alkyl group of 6–20 carbon atoms and $R_{15}$ is hydrogen or a lower alkyl group of 1–3 carbon atoms, or betaines of the formula

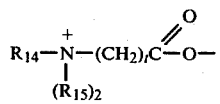

wherein $R_{14}$ and $R_{15}$ have the meanings given above and t is an integer. The above dopants are characterized by their polar nature and by the presence of long chain alkyl groups.

The dopants can be mixed with the hydrocarbon lubricant in a solvent mixture, for example, a heptane-isopropanol mixture, in which the components are soluble. The solution can be sprayed onto a high density information record in known manner, or the records can be immersed in the solution. Alternatively, the doped lubricant can be applied directly by means of a very fine nozzle.

The records have improved resistance to the effects of elevated temperatures and moisture, and the lubrication is sufficient to prevent undue stylus wear.

Although the exact mechanism of lubrication of high density information records is not known, it is known that the surface of these records is highly polar, as well as being water sensitive; thus, non-polar fluids do not adhere well or efficiently wet the surface of these records. The present dopants have highly polar end groups, as well as long chain alkyl groups which are non-polar. Thus the dopants interact with the disc surface, it is believed, at the sites of the polar groups, leaving a hydrocarbon chain above the disc surface. The hydrocarbon lubricant then can adhere well to the hydrocarbon chain protruding from the surface, thereby producing a lubricant that wets or adheres to the surface of the record and provides good lubrication as well.

The lubricant system of the present invention can be applied to conductive high density information records as they are pressed from the mold, which is preferable, or they can be cleaned first with an aqueous solution. The cleaned record may be dried with a solvent such as 1,1,2-trifluoro-2,2,1-trichloroethane.

The invention will be further illustrated by the following Examples, but the invention is not meant to be limited to the details described therein. In the Examples, parts and percentages are by weight unless otherwise noted.

Carrier distress time is measured by adding the amount of time in seconds (but discounting intervals of less than 10 microseconds) during record playback when the r.f. output of the player arm is less than 150 millivolts peak to peak and the time when the r.f. output gives above 8.6 or below 3.1 megahertz in frequency, indicating a defect. Such defects are noted by the viewer as dropouts. The present acceptable level of carrier distress for a video record is three seconds in one hour of playback time.

EXAMPLE 1

A molding composition was prepared by mixing 78 parts of Geon 110×346 polyvinylchloride of the B. F. Goodrich Company; 13 parts of Ketjenblack EC carbon black of the Armak Company; 1.5 parts of dibutyl-tin-β-mercaptopropionate commercially available as T-35 from M & T Chemical Company; 1.0 part of Mark 275 stabilizer of the Argus Chemical Company, a dibutyltin maleate stabilizer; 2.0 parts of Acryloid K-147 and 0.75 part of Acryloid K-275, acrylic modifiers of Rohm & Haas Company; 0.5 part of Loxiol G-30 and 0.25 part of Loxiol G-70 lubricants of Henkel International GmbH; 1.0 part of calcium stearate and 3.0 parts of diundecyl phthalate.

Video records were compression molded from the above composition at about 360° F. (182.2° C.). A solution was made of 0.3 percent polydecylethylene available as H-180 from NYE Inc. and 0.03 percent of a quaternary ammonium salt of a hydroxylated amine of the formula

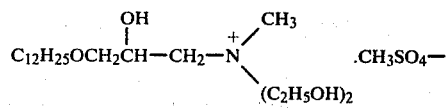

in an 80:20 mixture of heptane and isopropanol. The above described video records were spray coated with the solution.

The control records were lubricated with the standard fractionated methyl alkyl siloxane lubricant of the formula

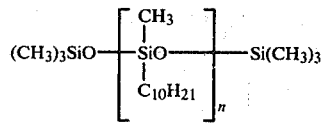

molecularly distilled at 205° C.

The results of carrier distress on initial playback and after stressing for one hour in a chamber maintained at 100° F. and 95 percent relative humidity are given below in Table I.

TABLE I

| | Initial Play | | | After Stress | | |
|---|---|---|---|---|---|---|
| | Median | Range | # Pass | Median | Range | # Pass |
| Control | 0 | 0–0 | 6/6 | 15 | 9.2–48 | 0/6 |
| Example 1 | 0 | 0–0 | 6/6 | 0.1 | 0–2 | 5/6 | where the carrier distress data is given in seconds for 30 minutes of playback time.

COMPARATIVE EXAMPLE 1

This example illustrates that the hydrocarbon lubricant alone does not properly lubricate the disc. The procedure of Example 1 was followed except that the discs were sprayed with 0.3 percent solution of polydecylethylene alone. The results are given below in Table II.

TABLE II

|  | Initial Play | | | After Stress | | |
|---|---|---|---|---|---|---|
|  | Median | Range | # Pass | Median | Range | # Pass |
| Comparative Example 1 | 0 | 0–0 | 6/6 | 6.6 | 3.5–23 | 0/6 |

COMPARATIVE EXAMPLE 2

Mixtures of the hydrocarbon polydecylethylene and non-polar additives are not effective to lubricate the records.

The procedure of Example 1 was followed except that the records were sprayed with a 0.3 percent solution of polydecylethylene containing 0.03 percent of a polyethylene glycol-dimethyl siloxane copolymer having the general formula

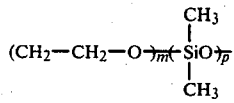

wherein m and p are integers, sold by Union Carbide Corporation as UC-7602.

The results are given below in Table III.

TABLE III

|  | Initial Play | | | After Stress | | |
|---|---|---|---|---|---|---|
|  | Median | Range | # Pass | Median | Range | # Pass |
| Comparative Example 2 | 0 | 0–0 | 6/6 | 18 | 5.7–36 | 0/6 |

EXAMPLE 2

The procedure of Example 1 was followed, except using a solution of polydecylethylene containing 0.03 percent of a dopant of the formula

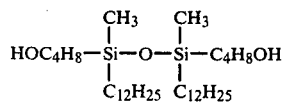

The playback data is summarized below in Table IV.

TABLE IV

|  | Initial Play | | | After Stress | | |
|---|---|---|---|---|---|---|
|  | Median | Range | # Pass | Median | Range | # Pass |
| Example 2 | 0 | 0–0 | 6/6 | 0.1 | 0–2.6 | 5/6 |

EXAMPLE 3

The procedure of Example 1 was followed using a solution of polydecylethylene containing 0.03 percent of cetyl betaine. The playback data is summarized below in Table V.

TABLE V

|  | Initial Play | | | After Stress | | |
|---|---|---|---|---|---|---|
|  | Median | Range | # Pass | Median | Range | # Pass |
| Example 3 | 0 | 0–0 | 5/5 | 0.2 | 0–0.7 | 5/5 |

EXAMPLE 4

This example illustrates that mixtures of more than one polar dopant can also be employed with the hydrocarbon lubricant of the invention.

In this example, polydecylethylene was mixed for Sample A with 0.03 percent of the dopant of Example 1 and 0.03 percent of the dopant of Example 2. For Sample B, polydecylethylene was mixed with 0.03 percent of the dopant of Example 1 and 0.03 percent of the dopant of Comparative Example 2. The playback data is summarized below in Table VI.

TABLE VI

|  | Initial Play | | | After Stress | | |
|---|---|---|---|---|---|---|
|  | Median | Range | # Pass | Median | Range | # Pass |
| Example 4A | 0 | 0–0 | 6/6 | 0 | 0–0.4 | 5/5 |
| Example 4B | 0 | 0–0.6 | 6/6 | 0.4 | 0–3.2 | 5/6 |

EXAMPLE 5

In this example, the records were made as in Example 1 except that a carbon black of the Cabot Corporation, CSX 150, was employed. The playback data for discs pressed from this compound and lubricated with polydecylethylene lubricant as above (Control) and a doped hydrocarbon containing 10 percent by weight of the dopant of Example 1 is given below in Table VII.

TABLE VII

|  | Initial Play | | | After Stress | | |
|---|---|---|---|---|---|---|
|  | Median | Range | # Pass | Median | Range | # Pass |
| Control | 0.3 | 0.1–4.5 | 4/6 | 377 | 292–531 | 0/6 |
| Example 5 | 0.1 | 0–0.5 | 5/5 | 0.2 | 0.1–2.6 | 4/6 |

We claim:

1. A high density information record adapted for use with a playback stylus to effect recovery of signals occupying a bandwidth of at least several megahertz when relative motion at a desired rate is established between said record and said stylus, said record comprising a disc of a conductive material containing an information track constituted by a surface relief pattern in said track to accommodate recovery of signals of said bandwidth upon establishment of relative motion at said rate, said record coated with a hydrocarbon lubricant of the formula

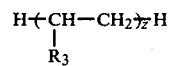

wherein $R_3$ is a long chain alkyl group of 4 to 20 carbon atoms and z is an integer, containing one or more polar dopants substituted with a long chain alkyl group.

2. A record according to claim 1 wherein said dopant is

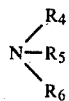

wherein $R_4$ is hydrogen, lower alkyl or hydroxyalkyl; $R_5$ is $R_7A$, wherein $R_7$ is an alkyl group of 1 to 5 carbon atoms and A is hydroxyl or carboxyl; $R_6$ can be $R_8A$ wherein $R_8$ is a straight chain alkyl group of 1 to 10 carbon atoms, and A has the meaning given above or can be $R_8A$—B—$R_9$ wherein $R_8$ and A have the meanings given above, B is a linking group which can be —O— or —C≡C— and $R_9$ is an alkyl group from 6 to 25 carbon atoms.

3. A record according to claim 1 wherein said dopant has the formula

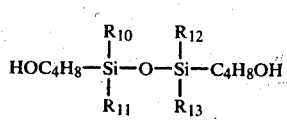

wherein $R_{10}$ and $R_{12}$ can be methyl or ethyl and $R_{11}$ and $R_{13}$ are linear long chain alkyl groups of up to 20 carbon atoms.

4. A record according to claim 1 wherein said dopant is

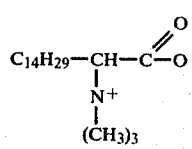

5. A record according to claim 1 wherein said lubricant is

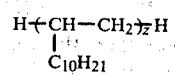

6. A record according to claim 1 wherein from about 5 to 40 percent by weight of the dopant based on the amount of lubricant is present.

7. A record according to claim 1 wherein said record is made of a conductive carbon-containing polymer or copolymer of polyvinylchloride.

8. A record according to claim 2 wherein the dopant is a corresponding quaternary ammonium salt having the formula

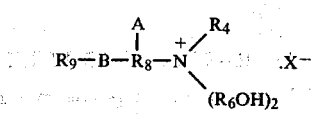

wherein X can be a halogen or —$CH_3SO_4$.

9. In a capacitance electronic disc having a lubricant coating thereon, the improvement which comprises utilizing as said lubricant a hydrocarbon compound of the formula

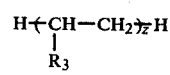

wherein $R_3$ is a long chain alkyl group of 4 to 20 carbon atoms and z is an integer containing one or more polar dopants substituted with a long chain alkyl group.

* * * * *